United States Patent [19]

Wilde et al.

[11] 4,248,041

[45] Feb. 3, 1981

[54] GAS TURBINE ENGINE POWER PLANT

[75] Inventors: Geoffrey L. Wilde, Turnditch; Maurice I. Taylor, Allestree; Geoffrey P. Medland, Castle Donington, all of England

[73] Assignee: Rolls-Royce Limited, London, England

[21] Appl. No.: 957,033

[22] Filed: Oct. 27, 1978

[30] Foreign Application Priority Data

Dec. 3, 1977 [GB] United Kingdom ............... 50457/77

[51] Int. Cl.³ ........................... F02K 1/10; F02K 3/06
[52] U.S. Cl. .................... 60/226 R; 60/229; 60/230; 60/224; 244/12.5; 244/23 D
[58] Field of Search ................ 60/224, 226 R, 226 A, 60/226 B, 229, 230, 232, 262, 263; 244/12.3, 12.4, 12.5, 23 D, 52

[56] References Cited

U.S. PATENT DOCUMENTS

| | | | |
|---|---|---|---|
| 3,162,397 | 12/1964 | Eichholtz | 244/52 |
| 3,447,764 | 5/1967 | Denning et al. | 60/226 |
| 3,517,509 | 6/1970 | Bayati | 60/224 |
| 3,577,736 | 5/1971 | Stevens | 244/23 D |
| 3,769,797 | 11/1973 | Stevens | 60/226 R |

Primary Examiner—Stephen C. Bentley
Attorney, Agent, or Firm—Cushman, Darby & Cushman

[57] ABSTRACT

A V.S.T.O.L. gas turbine power plant includes a main gas turbine engine having an exhaust gas propulsion nozzle and a fan arranged within a fan duct, which duct terminates in two nozzles such that a portion of the fan air may be directed vertically downwards or horizontally, the remaining portion of the fan air acts as a working fluid in one or more further auxiliary gas turbine engines each engine including a vectorable exhaust nozzle.

5 Claims, 4 Drawing Figures

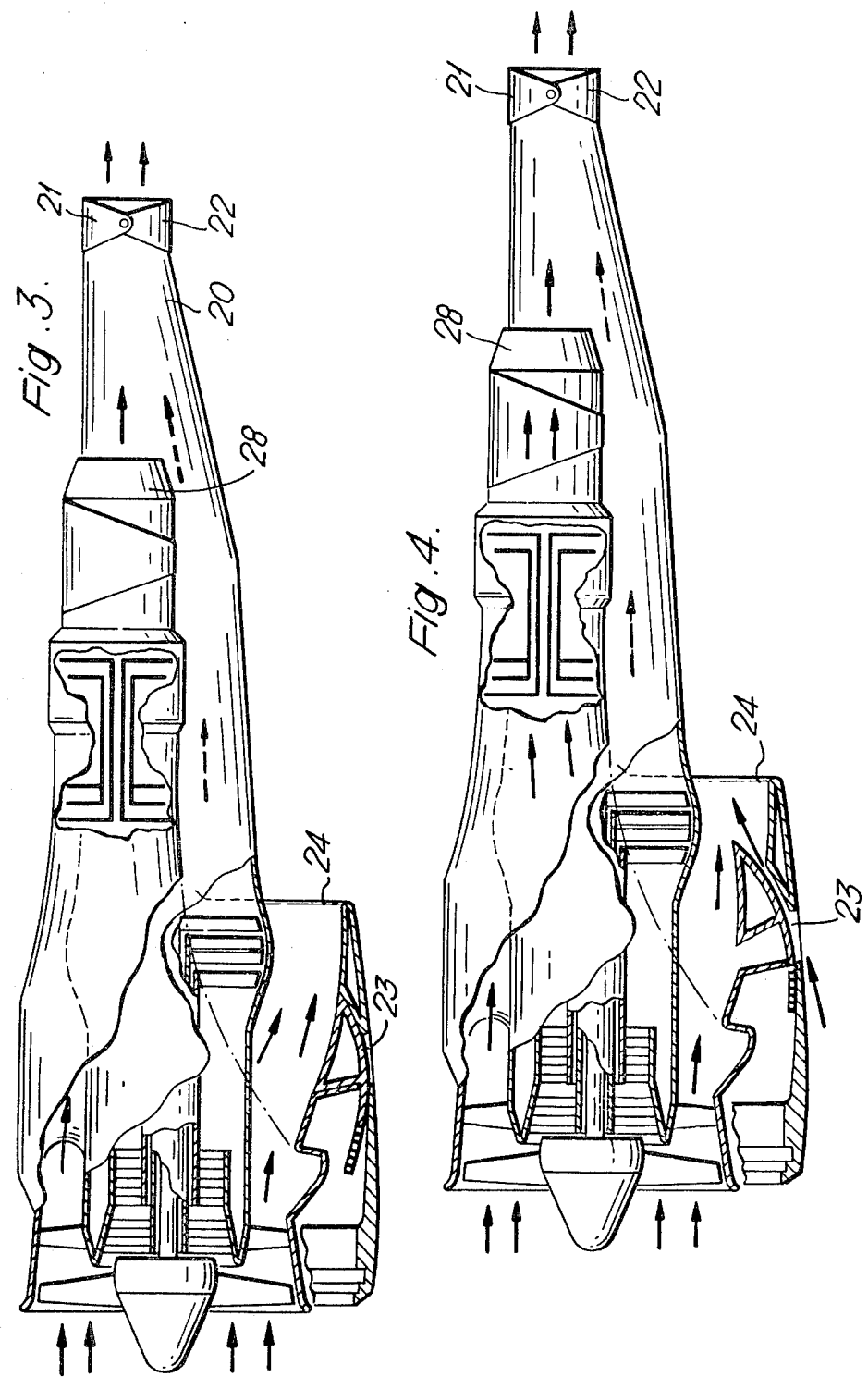

GAS TURBINE ENGINE POWER PLANT

This invention relates to gas turbine engine power plants and in particular to gas turbine engine power plants suitable for use in Vertical Take Off and Landing, or Short Take Off and Landing (V.T.O.L. or S.T.O.L.) type aircraft.

It is well known to provide such aircraft with a single gas turbine engine having a plurality of pivotal exhaust nozzles by means of which the direction of thrust produced by the engine may be varied. The aircraft can either be propelled forward in conventional flight with the nozzles discharging rearwards, or it can hover, or move vertically with the nozzles discharging downwards. The nozzles may be adjusted such as to provide both a degree of vertical lift and horizontal propulsion for transition between conventional forward flight and hover.

The best known type of such engines is provided with four pivotal exhaust nozzles the downstream two of which are supplied with hot exhaust gas, and the upstream two of which are supplied with relatively cool by-pass air.

Many proposals have been made for increasing the thrust of this type of engine all of which suffer from disadvantages. Such a type of engine has a low by-pass ratio and consideration has been given to either "scaling up" such an engine or alternatively increasing its by-pass ratio. This however results in the forward nozzles and associated pipework having to be excessively large to accomodate the increased flow of low pressure by-pass air.

Alternatively it has been proposed that the thrust from the two forward nozzles could be increased by burning additional fuel in the by-pass air passing to the nozzles (this is commonly known as reheat or plenum chamber burning). This suffers two main disadvantages, firstly the combustion of the fuel in the relatively low pressure by-pass air is inefficient and leads to high specific fuel consumption. Secondly uprating the thrust of the foremost nozzles leads to thrust balancing problems. For an engine of this type to function satisfactorily in an airframe, it is necessary to ensure that the resultant upthrust of all the nozzles pass through the centre of gravity of the engine/airframe combination when the nozzles are directed downwards. Therefore unless the foremost nozzles are continuously provided with reheat the thrust balance is not maintained.

A further alternative is to provide a gas turbine power plant comprising a main engine having a propulsion nozzles or nozzles and at least one auxiliary engine which is supplied with air from the main engine, the auxiliary engine being also provided with one or more vectorable propulsion nozzles.

All these types of engine suffer disadvantages in that they all have a relatively large frontal area which obviously increases aircraft drag. A further disadvantage is that as has previously been stated the engine thrust vector used in supporting or raising and lowering the aircraft vetically must be arranged as close to the aircraft centre of gravity as possible. This has usually resulted in the addition of weight to the aircraft nose or tail structure to achieve the necessary balance, obviously any weight increase in an aircraft is particularly undesirable.

An object of the present invention is to provide a gas turbine power plant suitable for a V.T.O.L. or S.T.O.L. aircraft in which the aforementioned disadvantages are substantially eliminated.

According to the present invention a V.S.T.O.L. gas turbine power plant comprises a main gas turbine core engine having an exhaust gas propulsion nozzle and a fan arranged within a fan duct, the fan duct including two exhaust nozzles by means of which a portion of the fan efflux may be ejected from the duct, a further portion of the fan efflux acting as a working fluid for at least one auxiliary gas turbine engine each at least one auxiliary engine having at least one vectorable exhaust nozzle.

Preferably the two fan nozzles are provided such that one ejects fan air in a vertically downward direction and the other ejects fan air in a horizontal direction.

Preferably the two fan nozzles are provided with a common slidable flap which is adapted to close off one or the other of the nozzles, and the flap includes a plurality of flow directing vanes whereby the fan efflux is directed vertically downwards from one said nozzle when this is in the operative condition.

For better understanding of the invention an embodiment thereof will now be more particularly described by way of example only and with reference to the accompanying drawings in which;

FIG. 3 shows a diagrammatic side view of the same power plant as that shown in FIG. 2 but in the normal cruise mode of operation, FIG. 4 shows a diagrammatic side view of the same power plant in the high speed cruise mode of operation.

Figure 1:
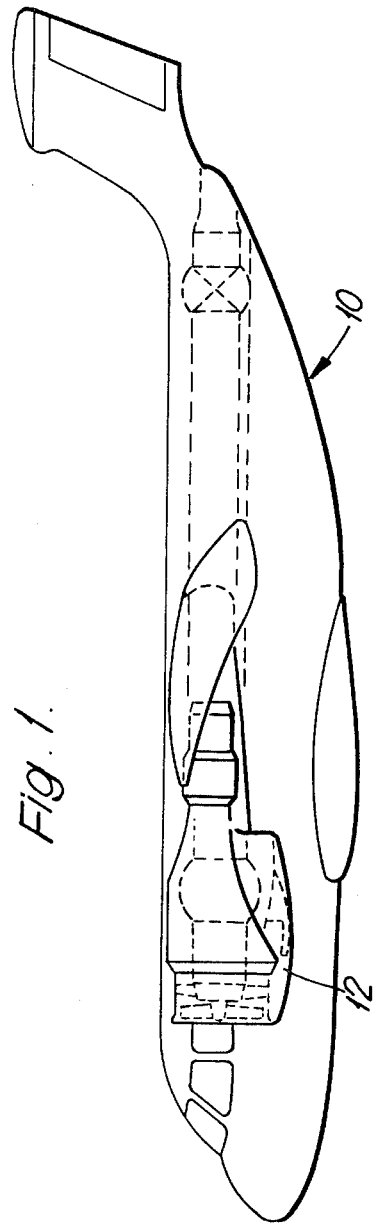
FIG. 1 shows a diagrammatic side view of a V.S.T.O.L. transport type aircraft.

Referring to FIG. 1 of the drawings an aircraft is shown diagrammatically at 10 and includes a portion of one power plant 12. It is envisaged that this aircraft would be propelled by two such power plants are being arranged on either side of the aircraft fuselage in pods.

Figure 2:
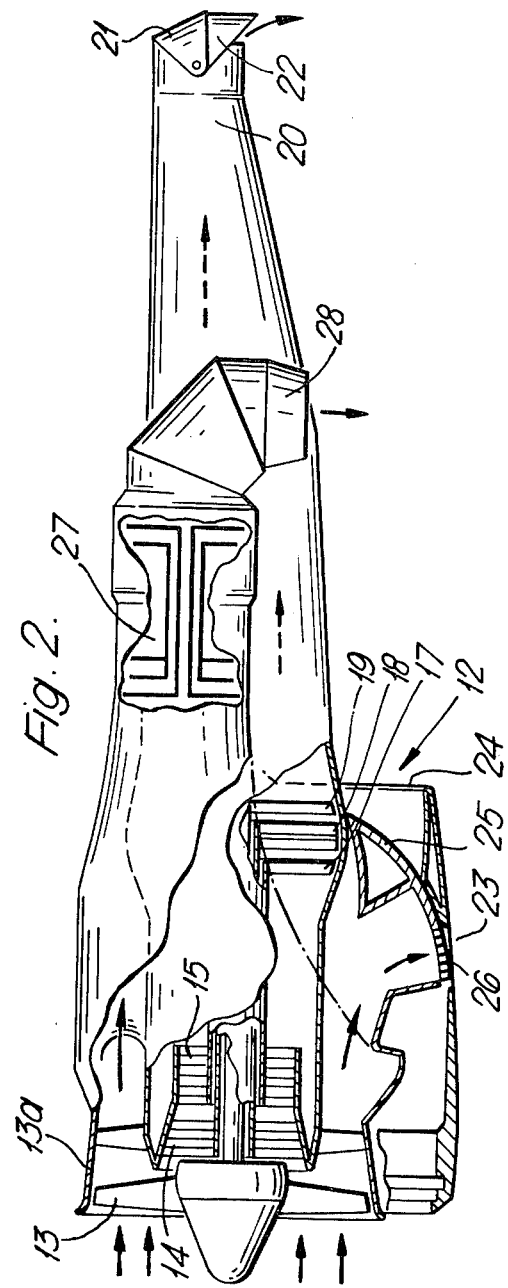
FIG. 2 shows a diagrammatic side view of a power plant in the vertical take off mode of operation suitable for the aircraft shown diagrammatically at FIG. 1.

FIG. 2 of the drawings shows an enlarged diagrammatic view of the power plant 12 which comprises a main core engine including in flow series a fan 13 situated within a fan duct 13a, an intermediate pressure compressor 14, a high pressure compressor 15, combustion equipment (not shown), a high pressure turbine 17, an intermediate pressure turbine 18, a low pressure turbine 19, the core engine terminating in a hot gas exhaust nozzle 20. The hot gas exhaust nozzle 20 also includes thrust reverser buckets 21 and 22.

The fan duct 13a terminates in two exhaust nozzles 23 and 24 each of which may be selectively closed off by means of a slidable flap 25 which is displaced between its respective locations by means not shown in the drawings. The slidable flap 25 also includes adjacent one end a plurality of flow diverting vanes 26 whereby the thrust from the nozzle 23 is directed vertically downwards.

Also arranged within a portion of the fan duct are two auxiliary engines one of which is shown at 27 the other being arranged in a similar location on the opposite side of the core engine 12. Each auxiliary engine which is shown diagrammatically at 27 comprises a gas turbine engine which in this particular embodiment is a two shaft engine. However it is envisaged that the auxiliary engines could in fact take the form of a one or three shaft engine if desired.

Each auxiliary engine 27 is supplied with pressurised fan air as a working fluid, and each engine terminates in a vectorable exhaust nozzle 28.

FIG. 2 of the drawings shows the power plant 12 in the vertical take off mode of operation and in this configuration the nozzle 24 is closed off by the flap 25 and approximately 30% of the fan air is directed through the cascade of flow directing vanes 26 and nozzle 23. The remaining 70% of the fan air is consumed by the auxiliary engines 27 such that they develop maximum power and their respective nozzles 28 are directed vertically downwards. The thrust reverser buckets 21 and 22 are arranged such as to direct the hot exhaust gas flow from the main core engine nozzle 20 vertically downwards. Transition from vertical flight to forward flight is achieved by vectoring the thrust rearwards from the nozzles 23, 24, 28 and the nozzle 20.

FIG. 3 shows a diagrammatic view of the power plant 12 in the normal or economical cruise condition. In this mode of operation the nozzle 23 is closed off by the flap 25 such that only the horizontal nozzle 24 is operative. The auxiliary engine nozzles 28 are directed horizontally, and the thrust reverser buckets 21 and 22 are positioned such as to provide an uninterrupted horizontal flow through the nozzle 20. In this configuration the two auxiliary engines 27 are maintained at flight idling speed to avoid base drag from their respective nozzle 28. The majority of the fan air in this instance is directed through the nozzle 24.

FIG. 4 shows a diagrammatic side view of the power plant 12 in the acceleration or high speed cruise condition. In this mode of operation the auxiliary engines 27 are run at high speed and the nozzle 24 is reduced in area.

It will be appreciated that by use of a power plant made in accordance with the present invention it is possible to provide an aircraft with the capabilities of both vertical take-off and landing and also economical cruise or alternatively high speed capability.

We claim:
1. A V/STOL gas turbine power plant for aircraft comprising:
 a main gas turbine core engine having an air intake and an exhaust gas propulsion nozzle;
 at least one auxiliary gas turbine engine having an air intake and a vectorable exhaust gas nozzle;
 a fan;
 a fan duct surrounding said fan and in continuous open communication with both the air intake of said main gas turbine core engine and the air intake of said at least one auxiliary gas turbine engine for continuously supplying a portion of the fan air thereto, said fan duct including two fan air exhaust nozzles for ejecting another portion of the fan air from the fan duct, one of said fan air exhaust nozzles ejecting fan air in a vertically downward direction and the other of said fan air exhaust nozzles ejecting fan air in a horizontal direction;
 and valve means for selectively closing one of said two fan air exhaust nozzles while at least partially opening the other of said two fan air exhaust nozzles.

2. A V/STOL gas turbine power plant as claimed in claim 1 in which said valve means includes a common slideable flap arranged to close at least one of said two fan air exhaust nozzles while at least partially opening the other of said two fan air exhaust nozzles.

3. A V/STOL gas turbine power plant as claimed in claim 2 wherein said slideable flap includes a plurality of flow directing vanes for directing the fan air efflux through the one of said two fan air exhaust nozzles which is arranged for ejecting fan air downwardly.

4. A V/STOL gas turbine power plant as claimed in claims 1, 2 or 3 in which said exhaust gas propulsion nozzle of said main gas turbine core engine is vectorable.

5. A V/STOL gas turbine power plant as claimed in claims 1, 2 or 3 in which said valve means has three positions of operation, a first position wherein said one fan air exhaust nozzle for ejecting fan air in a downward direction is open and said other fan air exhaust nozzle for ejecting fan air in a horizontal direction is closed, a second position wherein said fan air exhaust nozzle for ejecting fan air in a downward direction is closed and said other fan air exhaust nozzle for ejecting fan air in a horizontal direction is fully open, and a third position wherein in said one fan air exhaust nozzle for ejecting fan air in a downward direction is closed and said other fan air exhaust nozzle for ejecting fan air in a horizontal direction is partially open.

* * * * *